United States Patent
Matsuo et al.

(10) Patent No.: US 9,252,556 B2
(45) Date of Patent: Feb. 2, 2016

(54) AMPLIFYING OPTICAL FIBER AND OPTICAL AMPLIFIER

(71) Applicants: FUJIKURA LTD., Tokyo (JP); NIPPON TELEGRAPH AND TELEPHONE CORPORATION, Tokyo (JP); OSAKA PREFECTURE UNIVERSITY PUBLIC CORPORATION, Sakai-shi, Osaka (JP); National University Corporation Shimane University, Matsue-shi, Shimane (JP)

(72) Inventors: Shoichiro Matsuo, Sakura (JP); Katsuhiro Takenaga, Sakura (JP); Kentaro Ichii, Sakura (JP); Hirotaka Ono, Mito (JP); Kyouzou Tsujikawa, Tsukuba (JP); Makoto Yamada, Sakai (JP); Hiroji Masuda, Matsue (JP)

(73) Assignees: FUJIKURA LTD., Tokyo (JP); NIPPON TELEGRAPH AND TELEPHONE CORPORATION, Tokyo (JP); OSAKA PREFECTURE UNIVERSITY PUBLIC CORPORATION, Sakai-shi, Osaka (JP); NATIONAL UNIVERSITY CORPORATION SHIMANE UNIVERSITY, Matsue-shi, Shimane (JP)

( * ) Notice: Subject to any disclaimer, the term of this patent is extended or adjusted under 35 U.S.C. 154(b) by 0 days.

(21) Appl. No.: 14/441,029

(22) PCT Filed: Oct. 31, 2013

(86) PCT No.: PCT/JP2013/079644
§ 371 (c)(1),
(2) Date: May 6, 2015

(87) PCT Pub. No.: WO2014/073459
PCT Pub. Date: May 15, 2014

(65) Prior Publication Data
US 2015/0318661 A1 Nov. 5, 2015

(30) Foreign Application Priority Data
Nov. 7, 2012 (JP) .................................. 2012-245301

(51) Int. Cl.
*H01S 3/00* (2006.01)
*H01S 3/067* (2006.01)
(Continued)

(52) U.S. Cl.
CPC ........ *H01S 3/06754* (2013.01); *G02B 6/02042* (2013.01); *G02B 6/03605* (2013.01); *H01S 3/06733* (2013.01); *H01S 3/091* (2013.01); *H01S 3/06737* (2013.01)

(58) Field of Classification Search
CPC ............ G02B 6/02042; H01S 3/06733; H01S 3/06737; H01S 3/06754; H01S 3/094007
USPC ........................................................ 359/341.1
See application file for complete search history.

(56) References Cited

U.S. PATENT DOCUMENTS 5,566,196 A * 10/1996 Scifres ............... G02B 6/02042
372/6
8,693,088 B2 * 4/2014 Fini ...................... G02B 6/2835
359/334

(Continued)

FOREIGN PATENT DOCUMENTS

JP 2005-500538 A 1/2005
JP 2005-500583 A 1/2005

(Continued)

OTHER PUBLICATIONS

Abedin et al., "Cladding-pumped erbium-doped multicore fiber amplifier", Optics Express, Aug. 27, 2012, vol. 20, No. 18, pp. 20191-20200, cited in JP Office Action dated Nov. 4, 2014 and JP Decision to Grant a Patent dated Apr. 14, 2015.

(Continued)

*Primary Examiner* — Mark Hellner
(74) *Attorney, Agent, or Firm* — Westerman, Hattori, Daniels & Adrian, LLP

(57) ABSTRACT

The first cladding 52 has a two-layer structure formed of a solid inner layer 62A passed through the center axis of the first cladding 52 and an outer layer 62B enclosing the inner layer 62A and the plurality of cores 51 with no gap. A refractive index n1 of the core 51 is provided higher than refractive indexes $n_{2A}$ and $n_{2B}$ of the inner layer 62A and the outer layer 62B, the refractive indexes n2A and n2B of the inner layer 62A and the outer layer 62B are provided higher than a refractive index n3 of the second cladding 53, and the refractive index $n_{2A}$ of the inner layer 62A is provided lower than the refractive index $n_{2B}$ of the outer layer 62B.

7 Claims, 11 Drawing Sheets

(51) Int. Cl.
  *G02B 6/02*   (2006.01)
  *G02B 6/036*  (2006.01)
  *H01S 3/091*  (2006.01)

(56) References Cited

U.S. PATENT DOCUMENTS

| | | |
|---|---|---|
| 2009/0201575 A1 | 8/2009 | Fermann et al. |
| 2011/0141555 A1* | 6/2011 | Fermann ............ G02B 6/02009 359/341.3 |
| 2011/0279888 A1* | 11/2011 | Fini ...................... G02B 6/2835 359/334 |
| 2012/0195563 A1 | 8/2012 | Takenaga et al. |
| 2013/0063809 A1 | 3/2013 | Nishihara et al. |
| 2014/0240819 A1 | 8/2014 | Tsuchida et al. |

FOREIGN PATENT DOCUMENTS

| | | |
|---|---|---|
| JP | 2011-512653 A | 4/2011 |
| JP | 2013-58651 A | 3/2013 |
| JP | 2013-522914 A | 6/2013 |
| WO | 03/016958 A2 | 2/2003 |
| WO | 03/019257 A1 | 3/2003 |
| WO | 2011/024808 A1 | 3/2011 |
| WO | 2011/116075 A1 | 9/2011 |
| WO | 2013/051655 A1 | 4/2013 |

OTHER PUBLICATIONS

Mimura et al., "Batch Multicore Amplification with Cladding-Pumped Multicore EDF", Proceedings of Workshop of the Institute of Electronics, Information and Communication Engineers, Oct. 18, 2012, vol. 112, No. 259, pp. 151-154, Cited in JP Decision to Grant a Patent dated Apr. 14, 2015 and JP Office Action dated Nov. 4, 2014.
Matsuo et al., "Large-effective-area ten-core fiber with cladding diameter of about 200μm", Optics Letters, Dec. 1, 2011, vol. 36, No. 23, pp. 4626-4628.
Koshiba et al., "Multi-core fiber design and analysis: coupled-mode theory and coupled-power theory", Optics Express B102, vol. 19, No. 26, Dec. 12, 2011 (10 pages).
Office Action dated Nov. 4, 2014, issued in corresponding Japanese Patent Application No. 2012-245301, with English translation (6 pages).
Decision to Grant a Patent dated Apr. 14, 2015, issued in corresponding Japanese Patent Application No. 2012-245301, with English translation (5 pages).
International Search Report mailed Jan. 28, 2014 in International Application PCT/JP2013/079644.

* cited by examiner

AMPLIFYING OPTICAL FIBER AND OPTICAL AMPLIFIER

TECHNICAL FIELD

The present invention relates to an amplifying optical fiber and an optical amplifier that are preferable in the case where a multicore fiber is used for a transmission line.

BACKGROUND ART

In order to construct an optical communication system using a multicore fiber for a transmission line, an optical amplifier that amplifies communication light is essential. For a typical optical amplifier, it is widely known to use an erbium doped fiber (EDF). On the other hand, Patent Document 1 below is proposed as a multicore EDF.

CITATION LIST

Patent Document

[Patent Document 1] JP-A-2005-500538

SUMMARY OF INVENTION

Objects to be Achieved by the Invention

Meanwhile, in the case where pumping light is entered to a multicore EDF like one described in Patent Document 1, it is considered that pumping light is entered to cores individually. However, in the case where this configuration is provided, such a quantity of pumping light is necessary that a quantity of pumping light needed for amplification in a single core EDF is multiplied by the number of cores, and the use efficiency of pumping light is degraded. On this account, a problem is assumed that the efficiency of the amplification of pumping light is prone to deteriorate.

Therefore, it is an object of the present invention to provide an amplifying optical fiber and an optical amplifier that can improve the efficiency of the amplification of pumping light even though a plurality of cores is included.

Means for Achieving the Objects

An amplifying optical fiber according to the present invention to solve the object is an amplifying optical fiber including: a plurality of cores to which an active element is doped; a first cladding enclosing the plurality of cores with no gap; and a second cladding enclosing the first cladding. The plurality of cores is disposed around a center axis of the first cladding. The first cladding has a two-layer structure formed of a solid inner layer passed through the center axis of the first cladding and an outer layer enclosing the inner layer and the plurality of cores with no gap. A refractive index of the core is provided higher than refractive indexes of the inner layer and the outer layer. The refractive indexes of the inner layer and the outer layer are provided higher than a refractive index of the second cladding. The refractive index of the inner layer is provided lower than the refractive index of the outer layer.

According to this amplifying optical fiber, it is found by the present inventors that when the area other than the center axis of the first cladding in the area located on the inner side with respect to the plurality of cores is the incident point of pumping light on one end face of the first cladding, pumping light propagated through the core is increased as compared with the case where the center axis of the first cladding is defined as the incident point of pumping light. Therefore, it is possible to improve the density of pumping light individually in the cores, and as a result, it is possible to improve the efficiency of the amplification of pumping light even though a plurality of cores is included.

It is noted that it is fine that the incident point of pumping light is located in the area other than the center axis of the first cladding in the area located on the inner side with respect to the plurality of cores on one end face of the first cladding as described above. However, preferably, the incident point of pumping light may be an outer layer area on one end face of the first cladding, or may be an area other than a inner layer area located on an inner side with respect to the plurality of cores in the outer layer area.

It is found by the present inventors that in the case where this configuration is provided, pumping light can be concentrated on the outer layer in which the core is provided as the most part of the pumping light is not distributed in the inner layer. Therefore, it is possible to further improve the density of pumping light in the cores, and as a result, it is possible to further improve the efficiency of the amplification of pumping light.

Moreover, an optical amplifier according to the present invention is an optical amplifier including: an amplifying optical fiber including: a plurality of cores to which an active element is doped; a first cladding enclosing the plurality of cores with no gap; and a second cladding enclosing the first cladding; a pumping light source configured to emit pumping light for pumping the active element; a plurality of single core optical fibers to which communication light is entered; and an optical Fan-In configured to enter communication light incident on cores of the plurality of single core optical fibers to an end face of a core of the amplifying optical fiber corresponding to the core and to enter pumping light emitted from the pumping light source to a predetermined position on one end face of the amplifying optical fiber. The plurality of cores is disposed around a center axis of the first cladding. The first cladding has a two-layer structure formed of a solid inner layer passed through the center axis of the first cladding and an outer layer enclosing the inner layer and the plurality of cores with no gap. A refractive index of the core is provided higher than refractive indexes of the inner layer and the outer layer. The refractive indexes of the inner layer and the outer layer are provided higher than a refractive index of the second cladding. The refractive index of the inner layer is provided lower than the refractive index of the outer layer. The optical Fan-In enters the pumping light to an area other than the center axis of the first cladding on the one end face of the first cladding.

According to this optical amplifier, it is found by the present inventors that in the case where this configuration is provided, pumping light propagated through the core is increased as compared with the case where the center axis of the first cladding is defined as the incident point of pumping light. Therefore, it is possible to improve the density of pumping light in the cores, and as a result, it is possible to improve the efficiency of the amplification of pumping light even though a plurality of cores is included.

Preferably, the optical Fan-In enters the pumping light to an outer layer area on one end face of the first cladding, or to an area other than a inner layer area located on an inner side with respect to the plurality of cores in the outer layer area.

It is found by the present inventors that in the case where this configuration is provided, pumping light can be concentrated on the outer layer in which the core is provided as the most part of the pumping light is not distributed in the inner layer. Therefore, it is possible to further improve the density of pumping light in the cores, and as a result, it is possible to further improve the efficiency of the amplification of pumping light.

Effect of the Invention

As described above, according to the present invention, it is to provide an amplifying optical fiber and an optical amplifier that can improve the efficiency of the amplification of pumping light even though a plurality of cores is included.

BRIEF DESCRIPTION OF THE DRAWINGS

FIG. 10 is a cross sectional view of an exemplary structure of an optical Fan-In.

DESCRIPTION OF EMBODIMENTS (1) Embodiment

Figure 1:
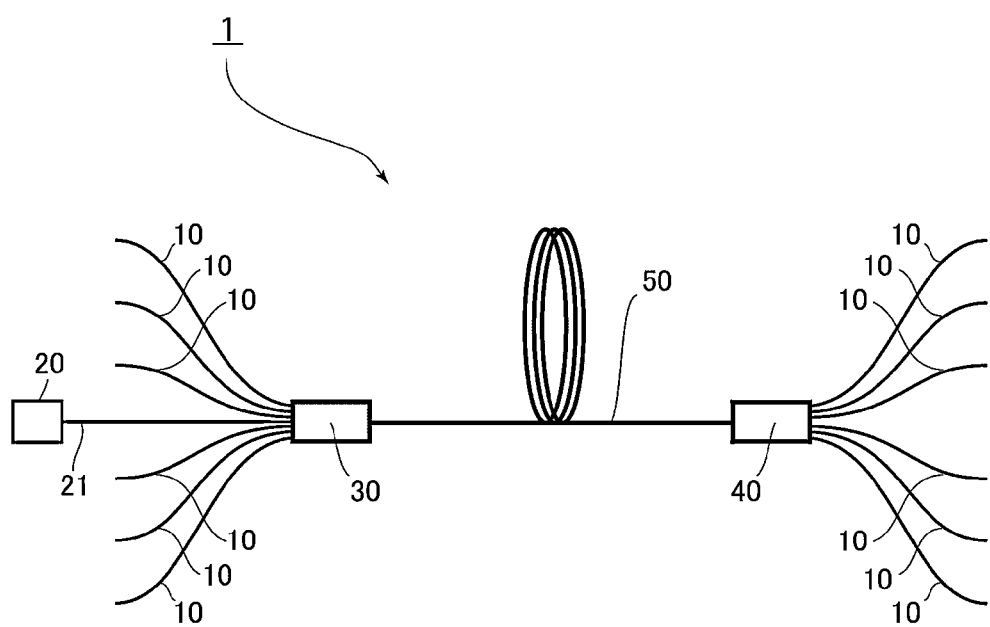
FIG. 1 is a diagram of an optical amplifier according to an embodiment.

An embodiment preferred to the present invention will be described in detail with reference to the drawings.
<Configuration of an Optical Amplifier>
FIG. 1 is a diagram of an optical amplifier according to an embodiment. As illustrated in FIG. 1, an optical amplifier 1 according to the embodiment includes a plurality of single core optical fibers 10, a pumping light source 20, an optical Fan-In 30, an optical Fan-Out 40, and an amplifying optical fiber 50 as a main configuration.

The single core optical fiber 10 is a single mode fiber that transmits communication light and has a structure in which a single core is enclosed by a cladding. The number of the single core optical fibers 10 is the same as the number of cores in the amplifying optical fiber 50.

The pumping light source 20 emits pumping light, which is a semiconductor laser device or a fiber laser device such as a Fabry-Perot type and a fiber ring type, for example.

The optical Fan-In 30 enters communication light incident on the individual cores of a plurality of the single core optical fibers 10 to the end face of the core of the amplifying optical fiber 50 corresponding to the core, and enters pumping light emitted from the pumping light source 20 to the center of one end face of the amplifying optical fiber 50.

The optical Fan-Out 40 emits communication light incident on a plurality of the individual cores of the amplifying optical fiber 50 to the end face of the core of the single core optical fiber 10 corresponding to the core.

Figure 2A:
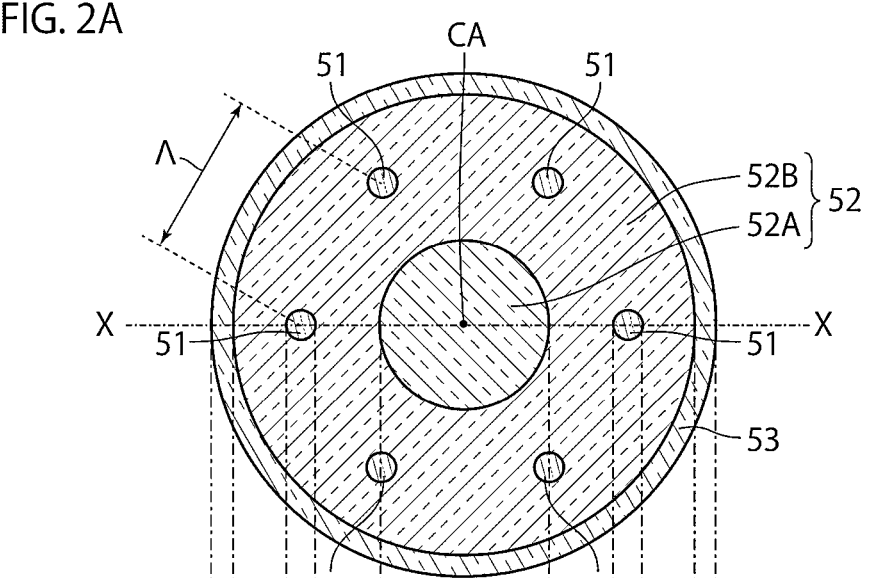
FIGS. 2A and 2B are diagrams of a cross section perpendicular to the longitudinal direction of an amplifying optical fiber.
Figure 2B:
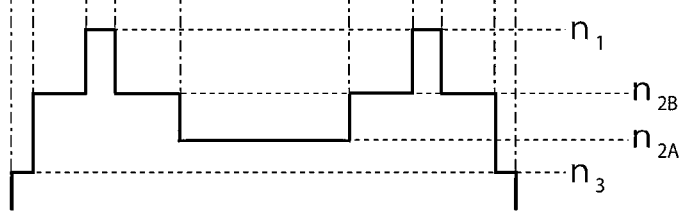

FIGS. 2A and 2B are a diagram of a cross section of the amplifying optical fiber 50 perpendicular to the longitudinal direction. More specifically, FIG. 2A is the structure of one end face of the amplifying optical fiber 50, and in FIG. 2B is the refractive index profile on line X-X in in FIG. 2A.

As illustrated in FIG. 2A, the amplifying optical fiber 50 includes a plurality of cores 51, a first cladding 52 that encloses the plurality of cores 51 with no gap, and a second cladding 53 that encloses the first cladding 52 as main components.

The plurality of cores 51 is disposed around a center axis CA of the first cladding 52 in the state in which a center axis distance A is equal between the cores adjacent to each other. The center axis CA of the first cladding 52 is also the center axis of the amplifying optical fiber 50.

It is noted that FIG. 1 illustrates the case of six cores 51, in which a distance from the center axis of the core 51 to the center axis CA of the first cladding 52 is made equal. In other words, the six cores 51 are equally disposed on the circumference of a circle about the center axis CA of the first cladding 52.

An active element is doped to the plurality of cores 51 individually. The active element includes a rare earth element such as erbium (Er), ytterbium (Yb), or neodymium (Nd), for example. Moreover, the active element other than the rare earth element includes bismuth, for example. It is noted that one type of active element may be doped to the core 51 or two types or more may be doped.

The first cladding 52 has a two-layer structure formed of a solid inner layer 52A passed through the center axis CA of the first cladding 52 and an outer layer 52B enclosing the inner layer 52A and the cores 51 with no gap.

As illustrated in in FIG. 2B, a refractive index $n_1$ of the core 51 is provided higher than a refractive index $n_{2A}$ of the inner layer 52A and a refractive index $n_{2B}$ of the outer layer 52B of the first cladding 52, and the refractive indexes $n_{2A}$ and $n_{2B}$ are provided higher than a refractive index $n_3$ of the second cladding 53. Moreover, the refractive index $n_{2A}$ of the inner layer 52A is provided lower than the refractive index $n_{2B}$ of the outer layer 52B.

Figure 3A:
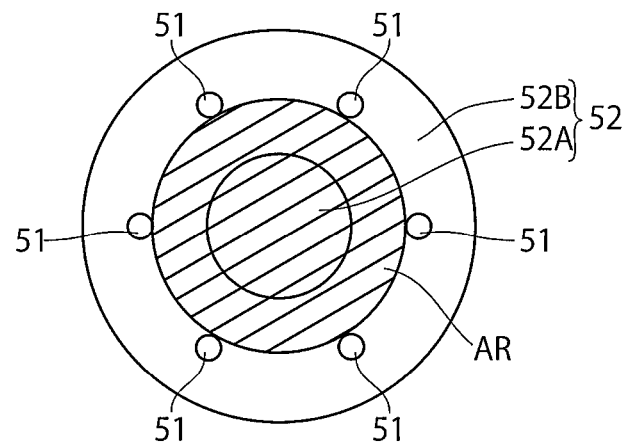
FIGS. 3A to 3C are diagrams for explaining a region to be the incident point of pumping light on one end face of the first cladding.
Figure 3B:
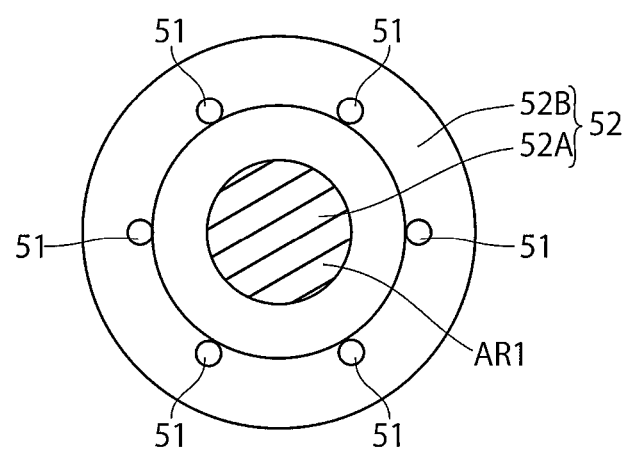
Figure 3C:
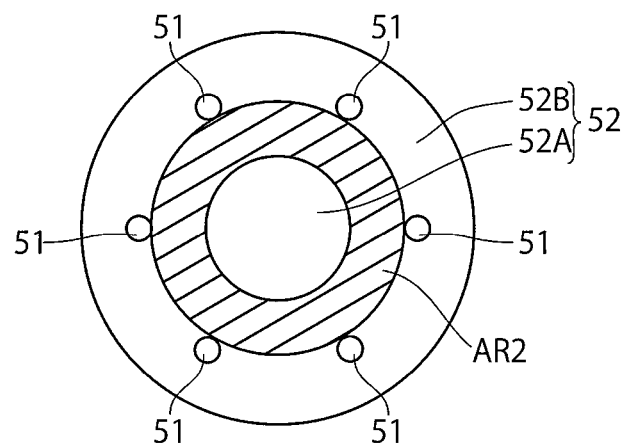

FIGS. 3A to 3C are diagrams for explaining a region to be the incident point of pumping light on one end face of the first cladding 52. More specifically, in FIG. 3A is an area AR on the inner side with respect to the cores 51, in FIG. 3B is a inner layer area AR1, and in FIG. 3C is an outer layer area AR2.

As illustrated in FIGS. 3A and 3B, in the embodiment, the area other than the inner layer area AR1 (in FIG. 3B) in the area AR (in FIG. 3A) located on the inner side with respect to the cores 51 is the incident point of pumping light on one end face of the first cladding 52.

In other words, as illustrated in FIG. 3C, the outer layer area AR2 surrounded by a circle inscribed on the inner side of the circumferential surfaces of the cores 51 and the circumference of the inner layer area AR1 is defined as the incident point of pumping light.

Materials of the first cladding 52 and the second cladding 53 include silica glass and a resin, for example. It is noted that from the viewpoint of increasing the difference between the refractive index n2 of the first cladding 52 and the refractive index n3 of the second cladding 53, preferably, the material of the first cladding 52 is silica glass, and the material of the second cladding 53 is a resin. Moreover, from the viewpoint of increasing the difference between the refractive index n2 of the first cladding 52 and the refractive index n3 of the second cladding 53, preferably, the second cladding 53 includes a plurality of vacancies. The second cladding 53 including a plurality of vacancies can be formed using a resin including a plurality of hollow particles, for example.

In the case of the embodiment, an expression below is satisfied:

$$5.8 \leq \Lambda/MFD(2\lambda c/(\lambda c+\lambda op)) \leq 8 \quad (1)$$

where the center axis distance between the cores 51 adjacent to each other is defined as $\Lambda$, the mode field diameter of the cores 51 is defined as MFD, the cutoff wavelength is defined as $\lambda c$, and the wavelength of communication light incident on the core 51.

<Operation and Effect>

In the optical amplifier 1 in the configuration above, communication light having a wavelength larger than the cutoff wavelength of a cable defined in ITU-T G.650.1, for example, is entered to the individual single core optical fibers 10. The communication light incident on the single core optical fibers 10 is entered to the core end face corresponding to the amplifying optical fiber 50 by the optical Fan-In 30.

On the other hand, pumping light emitted from the pumping light source 20 is guided to the optical Fan-In 30 through a light guide optical fiber 21 (FIG. 1), and is entered by the optical Fan-In 30 as the outer area AR2 on one end face of the first cladding 52 is defined as the incident point.

The pumping light is propagated through the first cladding 52 and the plurality of cores 51 of the amplifying optical fiber 50, and the pumping light pumps an active element doped to the core 51. The pumped active element causes stimulated emission by communication light propagated through the core 51, and the communication light is amplified due to the stimulated emission.

The communication light thus amplified is emitted to the end face of the core of the single core optical fiber 10 by the optical Fan-Out 40, and transmitted to the subsequent stage by the single core optical fiber 10.

Figure 4:
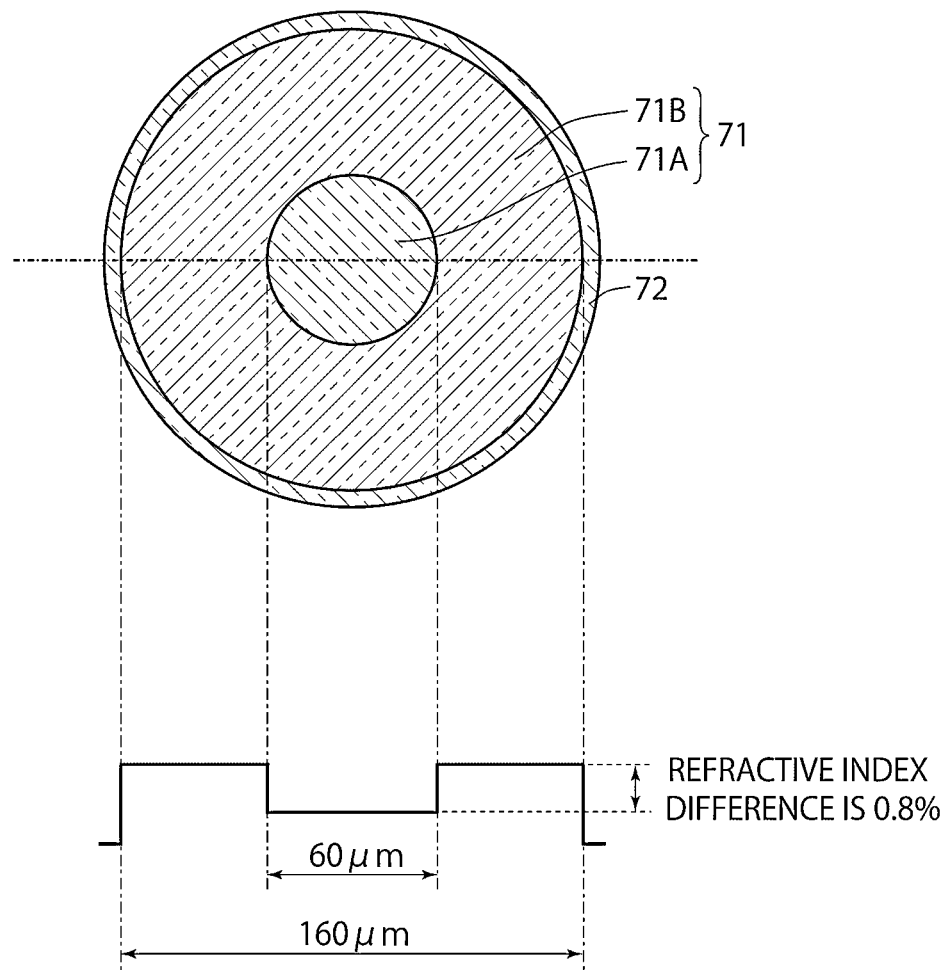
FIG. 4 is a diagram of the structure of an experimental fiber from a view point the same as the view point in FIGS. 2A and 2B.

FIG. 4 is a diagram of the structure of an experimental fiber from a view point the same as the view point in FIGS. 2A and 2B. As illustrated in FIG. 4, an experimental fiber 70 is formed of a silica glass layer 71 corresponding to the first cladding 52 and a low refractive index layer 72 corresponding to the second cladding 53.

The silica glass layer 71 has a two-layer structure including a inner layer 71A and an outer layer 71B similarly to the first cladding 52. It is noted that the cores 51 provided in the outer layer 52B of the amplifying optical fiber 50 according to the embodiment are omitted in the outer layer 71B of the experimental fiber 70.

FIGS. 5A and 5B and FIGS. 6A and 6B are the results that monitor a spread of pumping light in the experimental fiber 70 in the case of varying the incident point of pumping light to be entered to the experimental fiber 70.

It is noted that the pumping light source was an LED light source in a band of 1,300 nm whose center of the wavelength was 1,280 nm and pumping light was entered to one end face of the experimental fiber 70 from the pumping light source through a GI (graded-index) type fiber.

Figure 5A:
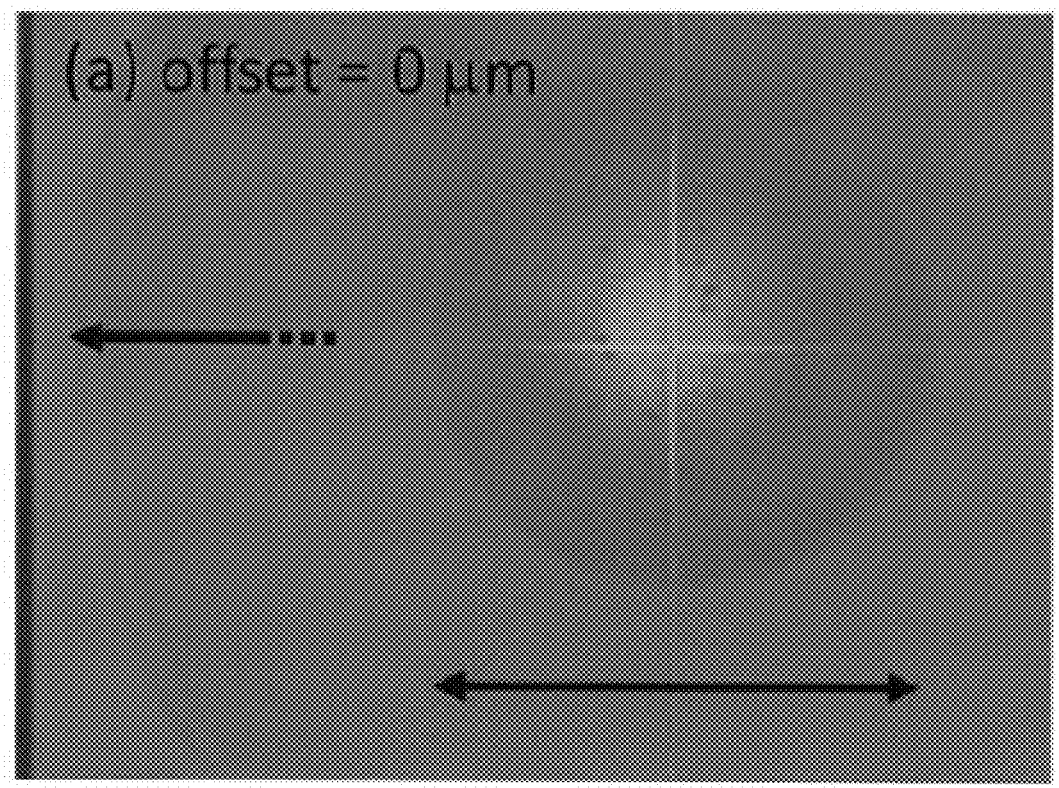
FIGS. 5A and 5B are diagrams of result (1) that monitors a spread of pumping light in the experimental fiber in the case of varying the incident point of pumping light to be entered to the experimental fiber.

As illustrated in FIG. 5A, in the case where the center axis of one end face of the experimental fiber 70 is set to the incident point of pumping light, the pumping light is trapped in the inner layer 71A of the silica glass layer 71.

Figure 5B:
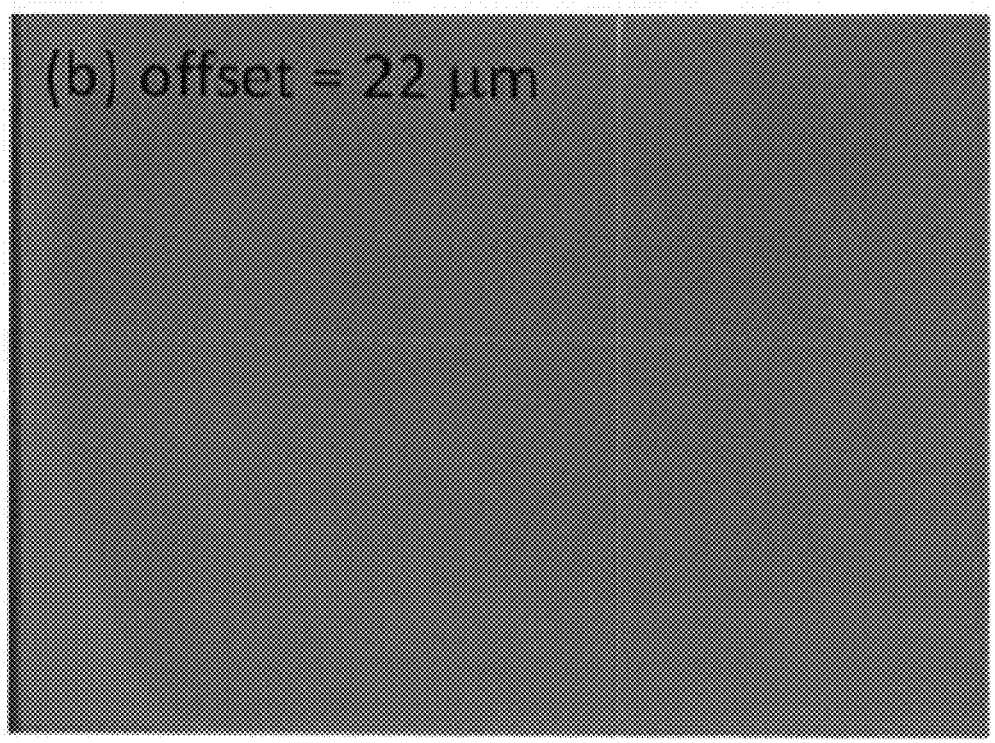

As illustrated in FIG. 5B, in the case where the position shifted 22 µm from the center axis of one end face of the experimental fiber 70 is set to the incident point of pumping light, the pumping light does not stay in the inner layer 71A of the silica glass layer 71 and spreads to the outer layer 71B.

Figure 6A:
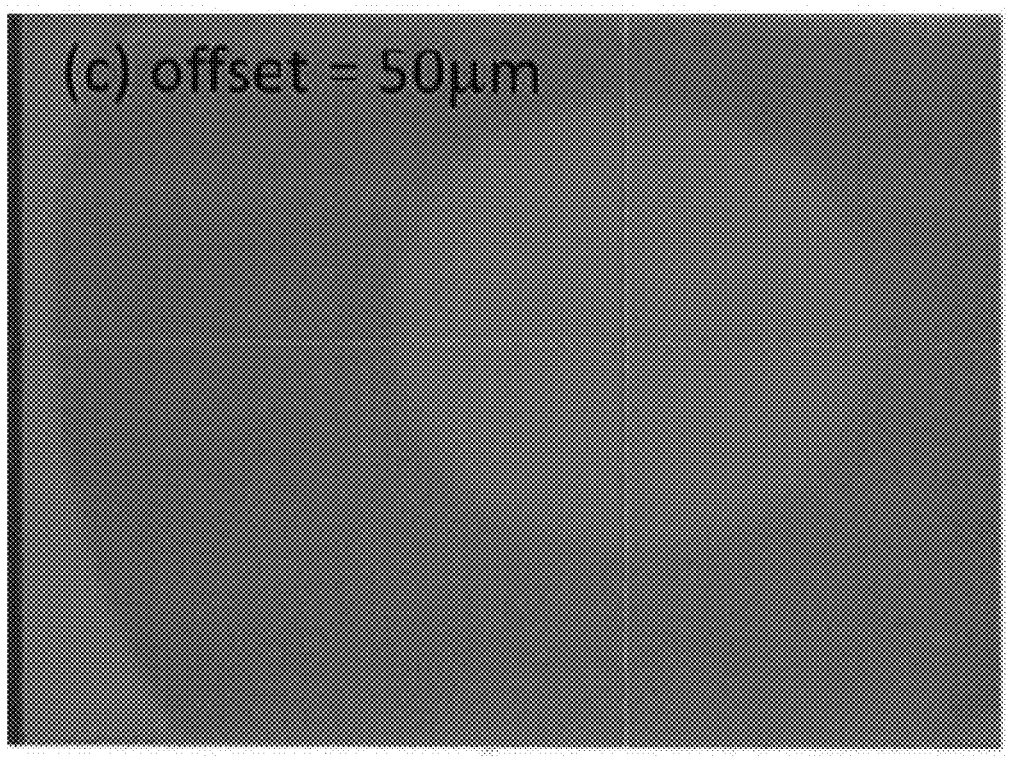
FIGS. 6A and 6B are diagram of result (2) that monitors a spread of pumping light in the experimental fiber in the case of varying the incident point of pumping light to be entered to the experimental fiber.
Figure 6B:
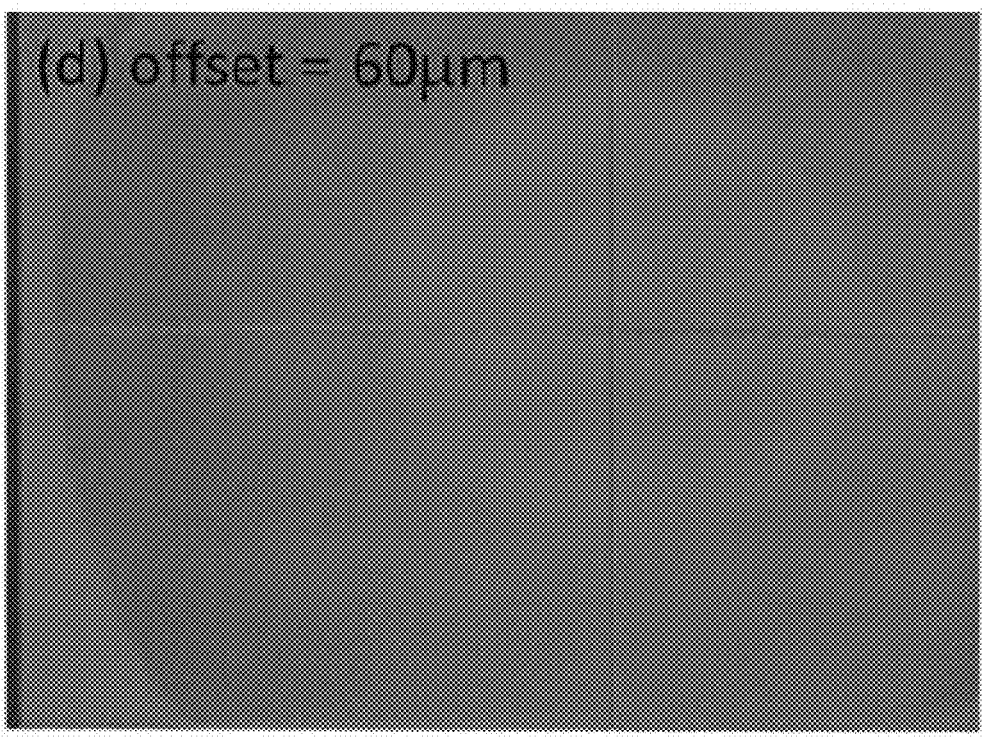

Moreover, as illustrated in in FIGS. 6A and 6B, in the case where the incident point of pumping light is located in the outer layer 71B, the most part of the pumping light is not distributed in the inner layer 71A and is concentrated on the outer layer 71B.

From FIGS. 5A and 5B and FIGS. 6A and 6B, it is found that the outer layer 71B whose refractive index is higher than the refractive index of the inner layer 71A is defined as the incident point of pumping light and pumping light can be concentrated on the outer layer 71B.

In the case of the amplifying optical fiber 50 according to the embodiment, the structure of the first cladding 52 is the two-layer structure formed of the inner layer 52A and the outer layer 52B whose refractive index $n_{2B}$ is higher than the refractive index $n_{2A}$ of the inner layer 52A as illustrated in FIGS. 2A and 2B. As illustrated in FIG. 3C, the outer layer area AR2 is defined as the incident point of pumping light.

Thus, pumping light can be concentrated on the outer layer 52B in which the cores 51 are provided, and the density of pumping light in the cores 51 can be improved. Accordingly, in accordance with the amplifying optical fiber 50 according to the embodiment, it is possible to improve the efficiency of the amplification of pumping light.

It is noted that it is confirmed that pumping light propagated through the core 51 is increased if only the incident point of pumping light is located on the area other than the center axis CA of the first cladding 52, even in the case where the area other than the inner layer area AR1 (in FIG. 3B), or the inner layer area AR1 (in FIG. 3B) and the outer layer area AR2 (FIG. 3C) are defined as the incident point of pumping light.

Moreover, in the amplifying optical fiber 50 according to the embodiment, as described above, $\Lambda/MFD(2\lambda c/(\lambda c+\lambda op))$ is defined as 5.8 or more.

Figure 7:
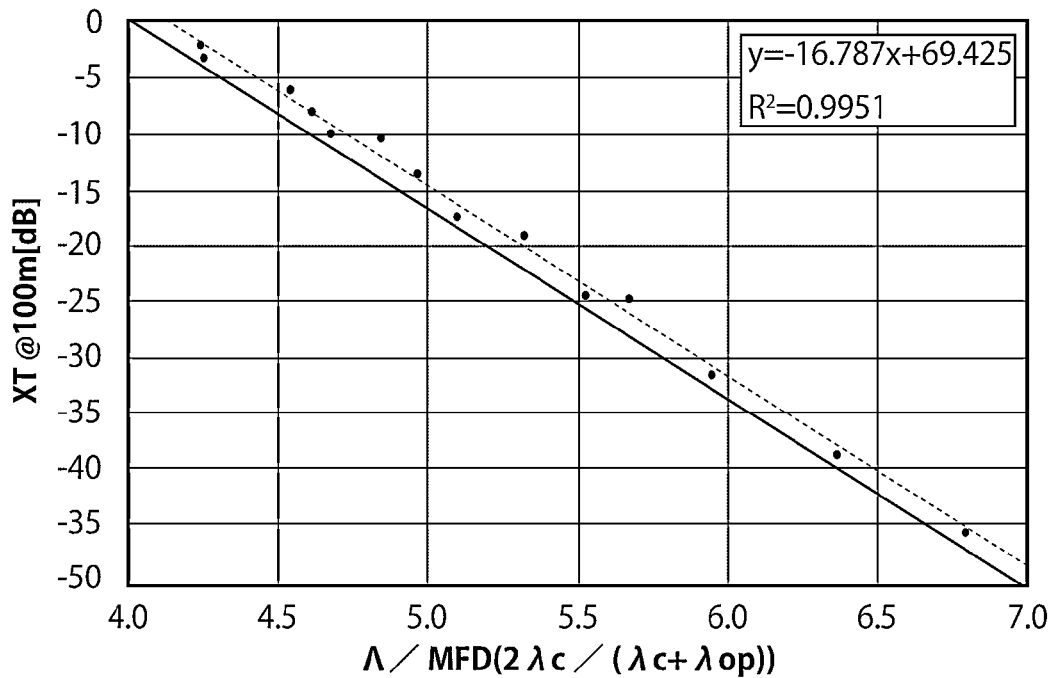
FIG. 7 is a graph of the relationship between the amount of crosstalk in the amplifying optical fiber and the ratio of the center axis distance between adjacent cores to the mode field diameter of the core in the case of consideration of the cutoff wavelength and the wavelength of communication light.

FIG. 7 is a graph of the relationship between $\Lambda/MFD(2\lambda c/(\lambda c+\lambda op))$ and the amount of crosstalk.

Points in the graph were obtained by calculating crosstalk according to Optics Express, Vol. 19, Issue 26, pp. B102-B111 (2011). Moreover, a broken line in the graph in FIG. 7 is a linear line closest to the points, and was calculated by a least-squares method. Moreover, a linear line in the graph in FIG. 7 is that the broken line is translated in such a manner that the points do not fall below the slope of the broken line. It is noted that XT expresses the amount of crosstalk at a length of 100 m.

From FIG. 7, $\Lambda/MFD(2\lambda c/(\lambda c+\lambda op))$ is correlated with the amount of crosstalk XT. In the case where it is found that this $\Lambda/MFD(2\lambda c/(\lambda c+\lambda op))$ is 5.8 or more, it is found that the amount of crosstalk XT is reduced lower than −30 dB, at which it is considered that substantial trouble does not arise in communication.

Moreover, it is known as a qualitative tendency to improve crosstalk by design in which the inter-core distance A is increased, or the mode field diameter MFD is reduced. It is shown that $(2\lambda c/(\lambda c+\lambda op))$ above converges on one when the cutoff wavelength $\lambda c$ approaches the wavelength $\lambda op$ of signal light. When the cutoff wavelength $\lambda c$ becomes longer, optical confinement to the core 51 becomes stronger, and it can be understood that crosstalk between cores is qualitatively improved.

Therefore, in the embodiment, it is possible to prevent trouble from arising in communication caused by crosstalk, and as a result, it is possible to amplify communication light while suppressing crosstalk.

Meanwhile, generally, the optical fiber is often disposed in the bent state. In the case where the optical fiber is disposed in this state, the outer diameter of the first cladding 52 is preferably 225 μm or less in order to suppress the probability of breaking of the optical fiber. This is described in detail in "Large-effective-area ten-core fiber with cladding diameter of about 200 μm" Optics Letters, Vol. 36 Issue 23, pp. 4626-4628 (2011).

On this point, in the amplifying optical fiber 50 according to the embodiment, $\Lambda/\text{MFD}(2\lambda c/(\lambda c+\lambda op))$ is eight or less as described above.

It was experimentally found that in the case where this configuration is provided, the amount of crosstalk can be suppressed to the extent that substantial trouble does not arise in communication even though the outer diameter of the first cladding is 225 μm or less in order to suppress the probability of breaking of the optical fiber when the inter-core distance $\Lambda$, the mode field diameter MFD, the cutoff wavelength $\lambda c$, and the wavelength $\lambda op$ of communication light are ones generally adopted.

Accordingly, in the embodiment, it is possible to practically prevent trouble from arising in communication caused by crosstalk, and as a result, it is possible to amplify communication light while suppressing crosstalk.

(2) Other Embodiments

As described above, the embodiment is described as an example. However, the present invention is not limited to the foregoing embodiment.

Figure 8:
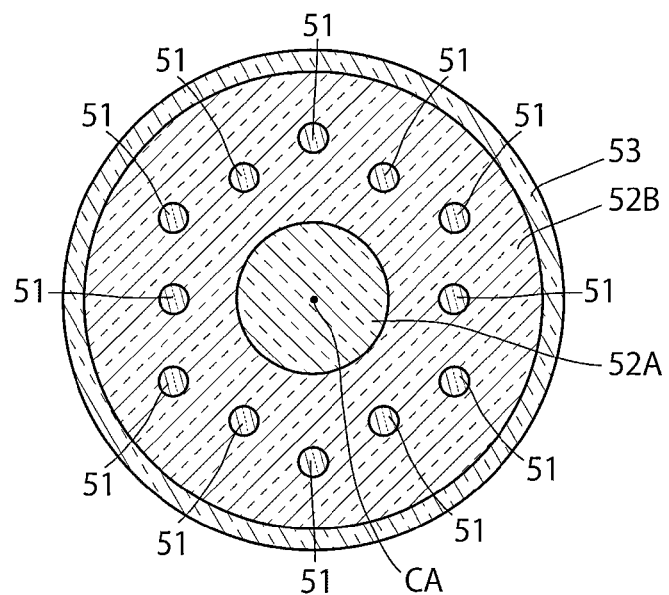
FIG. 8 is a diagram of the cross section of an amplifying optical fiber different in the number of cores and in the core disposition.

For example, in the forgoing embodiment, the example is shown in which six cores 51 are disposed on the circumference of a circle based on the center axis CA of the first cladding 52. However, as illustrated in an example in FIG. 8, a plurality of cores 51 may be disposed on any one or both of the apexes and sides of a regular polygon based on the center axis CA of a first cladding 52. It is noted that FIG. 8 is an example in which 12 cores are disposed on the apexes and the center of sides of a hexagon based on the center axis CA of the first cladding 52.

Moreover, in the forgoing embodiment, the incident point of pumping light to be entered to one end face of the first cladding 52 is defined as one. However, the incident point of pumping light may be two or more as in an example illustrated in FIG. 9.

Figure 9:
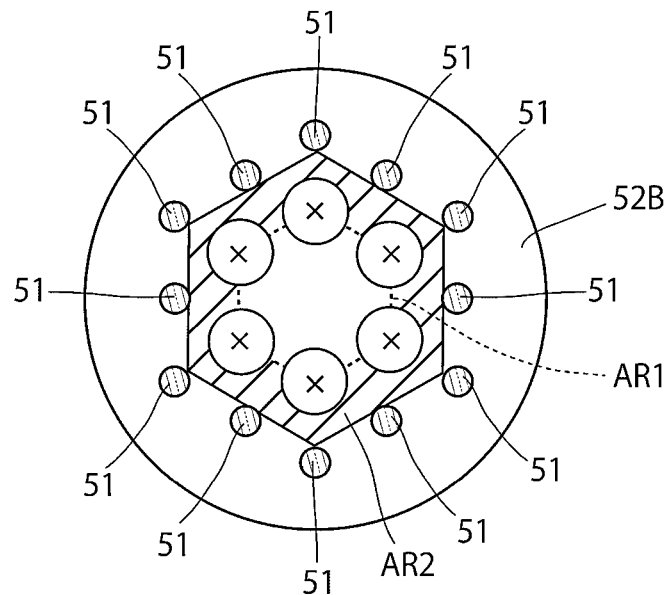
FIG. 9 is a diagram of the case where a plurality of incident positions of pumping light is provided.

More specifically, as illustrated in FIG. 9, a plurality of positions about the center axis CA of a first cladding 52 can be defined as the incident point of pumping light in the area AR2 surrounded by a hexagon inscribed on the inner side of the circumferential surfaces of cores 51 and the inner layer area AR1.

As described above, in the case where a plurality of incident points is provided for pumping light to be entered to the inner side of the cores 51 on one end face of the first cladding 52, pumping efficiency can be improved as compared with the case where a single incident point is provided.

It is noted that in the case where a plurality of incident points are provided for pumping light, it is fine that pumping light is entered from the optical Fan-In 30 through the light guide optical fibers 21 in the number corresponding to the number of incident points.

Figure 10:
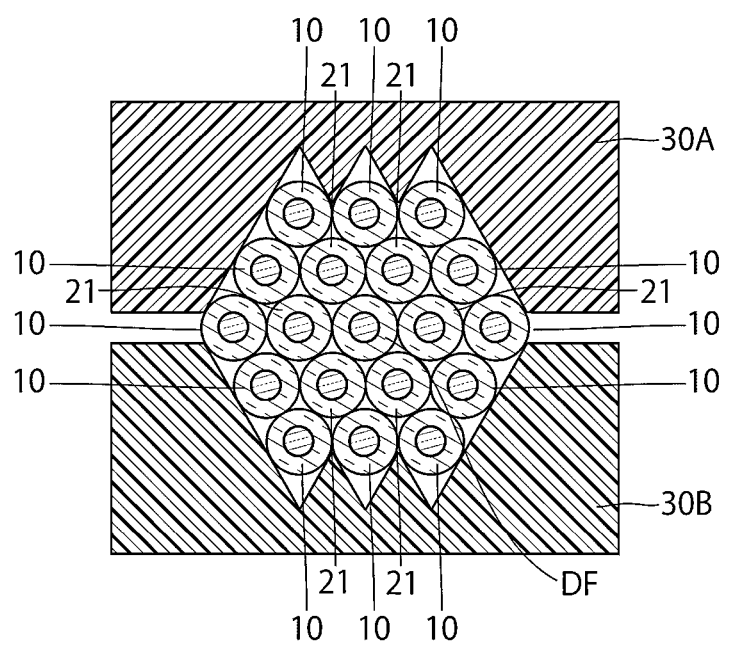

Meanwhile, for the optical Fan-In 30, a pair of glass members 30A and 30B are applicable which bind and fix a plurality of single core optical fibers 10 and a light guide optical fiber 21, for example, as illustrated in FIG. 10. It is noted that in FIG. 10, an example is shown in which the optical fibers are fixed in the state in which the optical fibers are bound in such a manner that 12 single core optical fibers 10 are provided on the outer side and six light guide optical fibers 21 are provided as highest density on the inner side. However, it is fine that the optical fibers are not fixed in the state of the closest packed structure. Moreover, in FIG. 10, the example is shown in which a dummy fiber DF is disposed as a spacer in the center of the six light guide optical fibers 21. However, the dummy fiber DF may be provided as the light guide optical fiber 21 or may be omitted.

Moreover, in the forgoing embodiment, the outer layer 52B has a single layer structure. However, the outer layer 52B may have a multilayer structure. It is noted that in the case where the outer layer 52B has a multilayer structure, it is necessary to provide a layer structure in which the refractive index of a layer in which the core 51 is provided is the highest and the refractive index of a layer becomes lower as more apart from the layer.

Furthermore, in the forgoing embodiment, the amplifying optical fiber 50 is adapted which satisfies expression (1) above. However, it is not essential to satisfy expression (1) above in the amplifying optical fiber 50.

EXAMPLES

In the following, the content of the present invention will be described more in detail with reference to an example. However, the present invention is not limited thereto.

In the example, the effect was confirmed that pumping light is concentrated in the first cladding 52 of the amplifying optical fiber 50 according to the embodiment.

In the example, 12 cores 51 were disposed on the apexes and the center of the sides of a hexagon based on the center axis of the first cladding 52 as the center axis distance $\Lambda$ was defined as 38 μm. Active elements doped to the core 51 were 0.2 wt % Er and 2 wt % Yb, and germanium (Ge), for example, was contained in the core 51 for adjusting the refractive index.

Moreover, the distance between the center of the core 51 and the circumferential surface of the first cladding 52 was defined as 35 μm, the refractive index ratio of the core 51 to the first cladding 52 was defend as 1.1%, and the wavelength $\lambda op$ of communication light to be entered to the core 51 was defined as 1,550 nm.

Moreover, the diameter of the first cladding 52 was defined as 218 μm, the diameter of the inner layer 52A was defined as 100 μm, and the refractive index difference of the inner layer 52A with respect to the outer layer 52B was defined as 0.7%.

Furthermore, pumping light was light of a multimode laser in a 1.55 μm band through a light guide optical fiber 21 having a diameter of 60 μm, and the incident point of the pumping light was defined as six positions surrounding the inner layer 52A in the outer layer area AR2 as illustrated in FIG. 9.

It was confirmed that in this amplifying optical fiber 50, pumping light was concentrated on the outer layer 52B as illustrated in FIGS. 6A and 6B.

It is noted that a cross sectional area S of the first cladding 52 is approximately 37,321 $\mu m^2$, and a cross sectional area S' of the inner layer 52A is 7,853 $\mu m^2$. Since the most part of pumping light is not generally distributed on the inner layer 62A, the area S-S' in which pumping light exists is 29,472 $\mu m^2$ in the example, and is reduced about 20% as compared with the case of the second example (37,321 μm²). Accordingly, the density of pumping light can be improved.

INDUSTRIAL APPLICABILITY

The present invention is applicable to the field of optical communication.

REFERENCE SIGNS LIST

1 . . . optical amplifier
10 . . . single core optical fiber
20 . . . pumping light source
30 . . . optical Fan-In
40 . . . optical Fan-Out
50 . . . Amplifying optical fiber
51 . . . core
52, 62 . . . first cladding
62A . . . inner layer
62B . . . outer layer
53 . . . second cladding

The invention claimed is:

1. An amplifying optical fiber comprising:
a plurality of cores to which an active element is doped;
a first cladding enclosing the plurality of cores with no gap; and
a second cladding enclosing the first cladding, wherein:
the plurality of cores is disposed around a center axis of the first cladding;
the first cladding has a two-layer structure formed of a solid inner layer passed through the center axis of the first cladding and an outer layer enclosing the inner layer and the plurality of cores with no gap;
a refractive index of the core is provided higher than refractive indexes of the inner layer and the outer layer;
the refractive indexes of the inner layer and the outer layer are provided higher than a refractive index of the second cladding; and
the refractive index of the inner layer is provided lower than the refractive index of the outer layer.

2. The amplifying optical fiber according to claim 1, wherein an area other than the center axis of the first cladding on one end face of the first cladding is an incident point of pumping light.

3. The amplifying optical fiber according to claim 2, wherein an outer layer area on one end face of the first cladding is an incident point of the pumping light.

4. The amplifying optical fiber according to claim 2, wherein an area other than a inner layer area located on an inner side with respect to the plurality of cores is an incident point of pumping light in the outer layer area.

5. An optical amplifier comprising:
an amplifying optical fiber including:
a plurality of cores to which an active element is doped;
a first cladding enclosing the plurality of cores with no gap; and
a second cladding enclosing the first cladding;
a pumping light source configured to emit pumping light for pumping the active element;
a plurality of single core optical fibers to which communication light is entered; and
an optical synthesizer configured to enter communication light incident on cores of the plurality of single core optical fibers to an end face of a core of the amplifying optical fiber corresponding to the core and to enter pumping light emitted from the pumping light source to a predetermined position on one end face of the amplifying optical fiber, wherein:
the plurality of cores is disposed around a center axis of the first cladding;
the first cladding has a two-layer structure formed of a solid inner layer passed through the center axis of the first cladding and an outer layer enclosing the inner layer and the plurality of cores with no gap;
a refractive index of the core is provided higher than refractive indexes of the inner layer and the outer layer;
the refractive indexes of the inner layer and the outer layer are provided higher than a refractive index of the second cladding;
the refractive index of the inner layer is provided lower than the refractive index of the outer layer; and
the optical synthesizer enters the pumping light to an area other than the center axis of the first cladding on the one end face of the first cladding.

6. The optical amplifier according to claim 5, wherein the optical synthesizer enters the pumping light to an outer layer area on one end face of the first cladding.

7. The optical amplifier according to claim 6, wherein the optical synthesizer enters the pumping light to an area other than a inner layer area located on an inner side with respect to the plurality of cores in the outer layer area.

* * * * *